United States Patent [19]

Arakik

[11] Patent Number: 5,446,707
[45] Date of Patent: Aug. 29, 1995

[54] DEVICE FOR REDUCING ELECTROMAGNETIC INTERFERENCE IN DISC RECORDING AND/OR REPRODUCING APPARATUS WITH RADIO RECEIVING FUNCTION

[75] Inventor: Akio Arakik, Chiba, Japan

[73] Assignee: Sony Corporation, Tokyo, Japan

[21] Appl. No.: 156,457

[22] Filed: Nov. 23, 1993

[30] Foreign Application Priority Data

Dec. 8, 1992 [JP] Japan .................................. 4-351681

[51] Int. Cl.6 ............................................ G11B 11/00
[52] U.S. Cl. ........................................ 369/13; 333/12
[58] Field of Search .................. 369/13, 14, 32, 44.24, 369/292, 75.01; 333/12, 185, 181, 182, 246

[56] References Cited

U.S. PATENT DOCUMENTS 4,384,331  5/1983  Fukuhara et al. ..................... 364/431
5,165,055  11/1992  Metsler .............................. 333/12

FOREIGN PATENT DOCUMENTS

0233669A1  8/1987  European Pat. Off. .
0418149A2  3/1991  European Pat. Off. .
0473305    4/1992  European Pat. Off. .

OTHER PUBLICATIONS

Patent Abstracts of Japan, vol. 7, No. 174 (E-190)(1319), 2 Aug. 1983 & JP-A-58 080 946 (Nintendu K.K.), 6 May 1983.
Patent Abstracts of Japan, vol. 8, No. 8 (E-221)(1445), 13 Jan. 1984 & JP-A-58 173 927 (Nissan Jidosha K.K.), 12 Oct. 1983.

Primary Examiner—Ali Neyzari
Attorney, Agent, or Firm—Limbach & Limbach; W. Patrick Bengtsson

[57] ABSTRACT

A disc recording and/or reproducing apparatus with a radio receiving function wherein a recording/playback unit having a high-frequency clock generator is housed in a shield case, and both input and output signals of the recording/playback unit are transferred to and from other circuits via a pair of filter disposed inside and outside the shield case, or such input and output signals are transferred via opto-electric convertor and electro-optical convertor disposed inside and outside the case, so that any unrequited high-frequency components radiated from input and output connection leadwires piercing through the shield case can be suppressed to consequently achieve remarkable reduction of the high-frequency noise entering into the radio receiving unit.

12 Claims, 4 Drawing Sheets

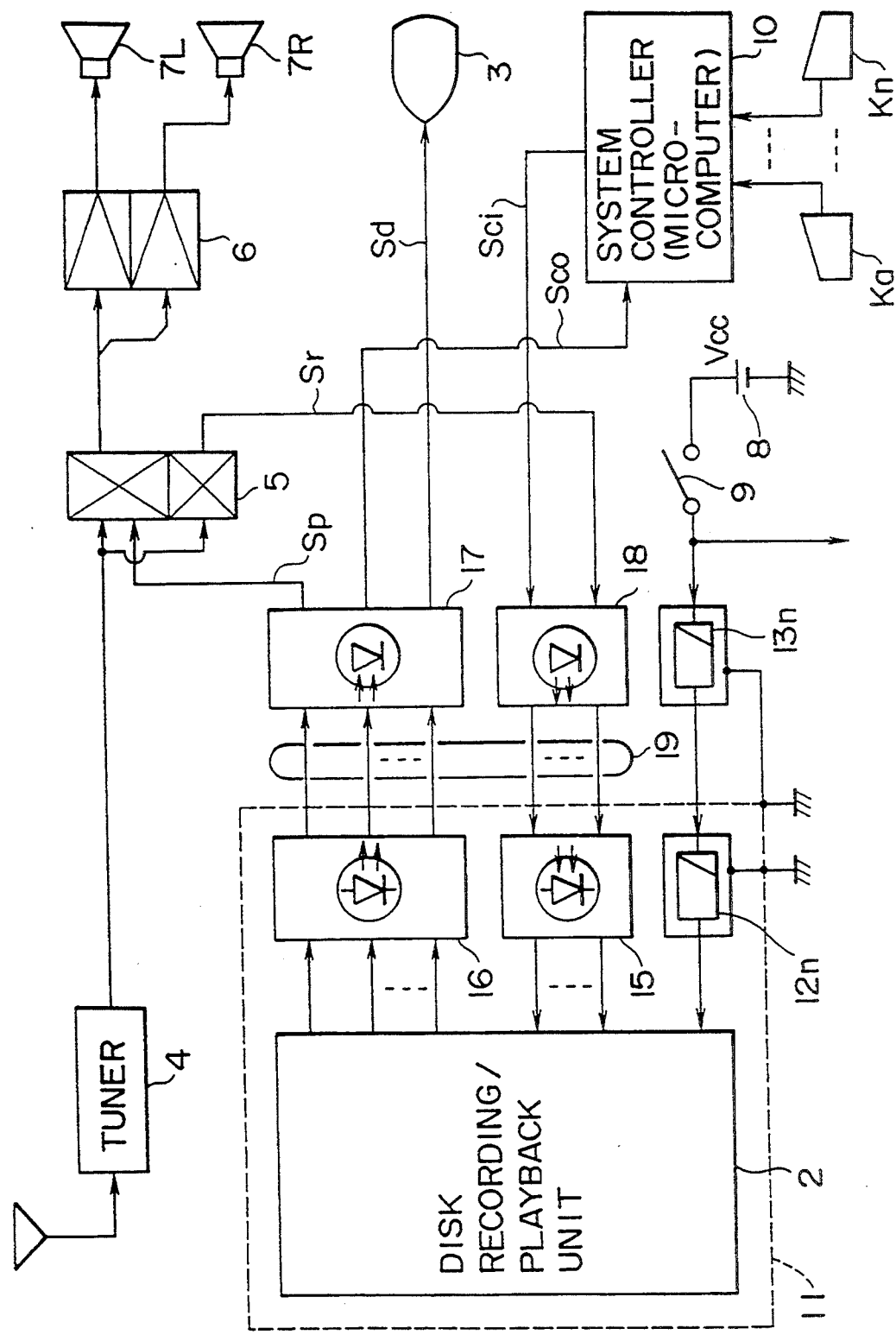

DEVICE FOR REDUCING ELECTROMAGNETIC INTERFERENCE IN DISC RECORDING AND/OR REPRODUCING APPARATUS WITH RADIO RECEIVING FUNCTION

BACKGROUND

1. Field of the Invention

The present invention relates to a disc recording and/or reproducing apparatus equipped with a radio receiving function. More particularly, the present invention relates to a disc recording and/or reproducing apparatus having device for reducing electromagnetic interference in such the apparatus.

2. Background of the Invention

There are widely used composite audio apparatus such as radio-equipped cassette tape recorders each consisting of a combination of an AM-FM radio receiver and a stereo tape recorder employing a cassette tape as a recording medium, due to the convenient capability of recording radio broadcast programs with facility.

Of late, there is proposed a portable digital audio disc recording and/or reproducing apparatus which employs a rewritable optical disc such as a magneto-optical disc. A novel composite audio apparatus is currently contrived, similarly to the conventional radio-equipped cassette tape recorder, by combining such a digital audio disc recording and/or reproducing apparatus with a radio receiver.

In recording a data signal on a rewritable magneto-optical disc, a recording current corresponding to the data signal is supplied to a magnetic head while a light beam is irradiated to a recording layer on the disc to heat the same. As a result, new data is written simultaneously with erasure of the previous data recorded already on the disc.

However, in such the digital audio disc recording and/or reproducing apparatus, the frequencies of the recording currents are included in the AM radio broadcast band. And predetermined processes of the data signal are executed in accordance with clock pulses of various high frequencies.

Therefore the high-frequency recording current, the clock pulses and unrequited high-frequency components such as higher and lower harmonics thereof radiated from the disc recording and/or reproducing apparatus are compounded with one another and act as high-frequency noise on a radio receiver disposed in the proximity. Consequently, there occurs a problem of interference with satisfactory reception of a radio broadcast.

When merely the radio receiver alone is to be operated, the above problem is preventable by switching off the power supply of the digital audio disc recording and/or reproducing apparatus which is a source of such high-frequency noise, or by stopping the oscillation of clock pulses.

However, when a radio broadcast is to be recorded on the digital audio disc, the recording and/or reproducing apparatus is naturally not permitted to be switched off. It is therefore impossible to accomplish a satisfactory broadcast recording operation unless the above problem is valved.

A similar problem arises also in a composite audio apparatus consisting of a combination of a digital audio tape recorder or a digital compact cassette recorder and a radio receiver, or in a composite audio-visual apparatus consisting of a combination of a disc recorder/player or the like and a television receiver with a liquid crystal display.

Of the conventional methods known heretofore for eliminating or suppressing such high-frequency noise, an exemplary one is based on the use of a shield case or a filter circuit as disclosed in U.S. Pat. No. 5,165,055.

SUMMARY OF THE INVENTION

It is, therefore, an object of the present invention to provide a disc recording and/or reproducing apparatus which resolves the abovementioned problems.

According to this invention, there is provided a disc recording and/or reproducing apparatus with a radio receiving function wherein input and output signals of a recording/playback unit are once passed via a first filter housed in a shield case together with the recording/playback unit, and the signals processed via the first filter are then passed further via a second filter to suppress any unrequited high-frequency components, whereby the high-frequency noise entering into the radio-receiving unit is reduced to a remarkably great extent.

In a alternate embodiment, there is provided a disc recording and/or reproducing apparatus with a radio receiving function which including first and second electro-optical convertors and a shield case. The first electro-optical convertor converts an output electric signal of a recording/playback unit into an optical signal and also converts an input optical signal thereof into an electric signal. The shield case contains the recording/playback unit and the first electro-optical convertor therein. The second electro-optical convertor converts the input and output optical signals of the first convertor into electric signals and also converts the electric signals thereof into optical signals.

In the embodiment of the disc recording and/or reproducing apparatus with a radio receiving function of the present invention, any unrequited high-frequency component radiated from the recording/playback unit having a high-frequency clock generator therein is suppressed through the first and second filter means, so that the high-frequency noise entering into the radio receiving unit can be reduced to a remarkably great extent.

In the embodiment of the disc recording and/or reproducing apparatus with a radio receiving function of the present invention, the input and output signals of the recording/playback unit are transferred as optical signals to and from the circuits outside the shield case, thereby suppressing the interference of the electromagnetic waves radiated from the recording/playback unit to the radio receiving unit.

The above and other features and advantages of the present invention will become apparent from the following description which will be given with reference to the illustrative accompanying drawings.

BRIEF DESCRIPTION OF THE DRAWINGS

The invention will be more readily understood with reference to the accompanying drawing, wherein:

FIG. 5 is a block diagram of an electric constitution in a second embodiment of the present invention.

DESCRIPTION OF THE INVENTION

Hereinafter a description will be given with reference to FIGS. 1 through 4 on a disc recording and/or reproducing apparatus with a radio receiving function. In the present invention, the disc recording and/or reproducing apparatus with a radio receiving unit is applied to a composite audio apparatus which consists of a combination of a radio receiver and a magneto-optical disc recording and/or reproducing apparatus adopting an audio data compression-expansion process.

[Disc recording/playback unit]

Figure 1:
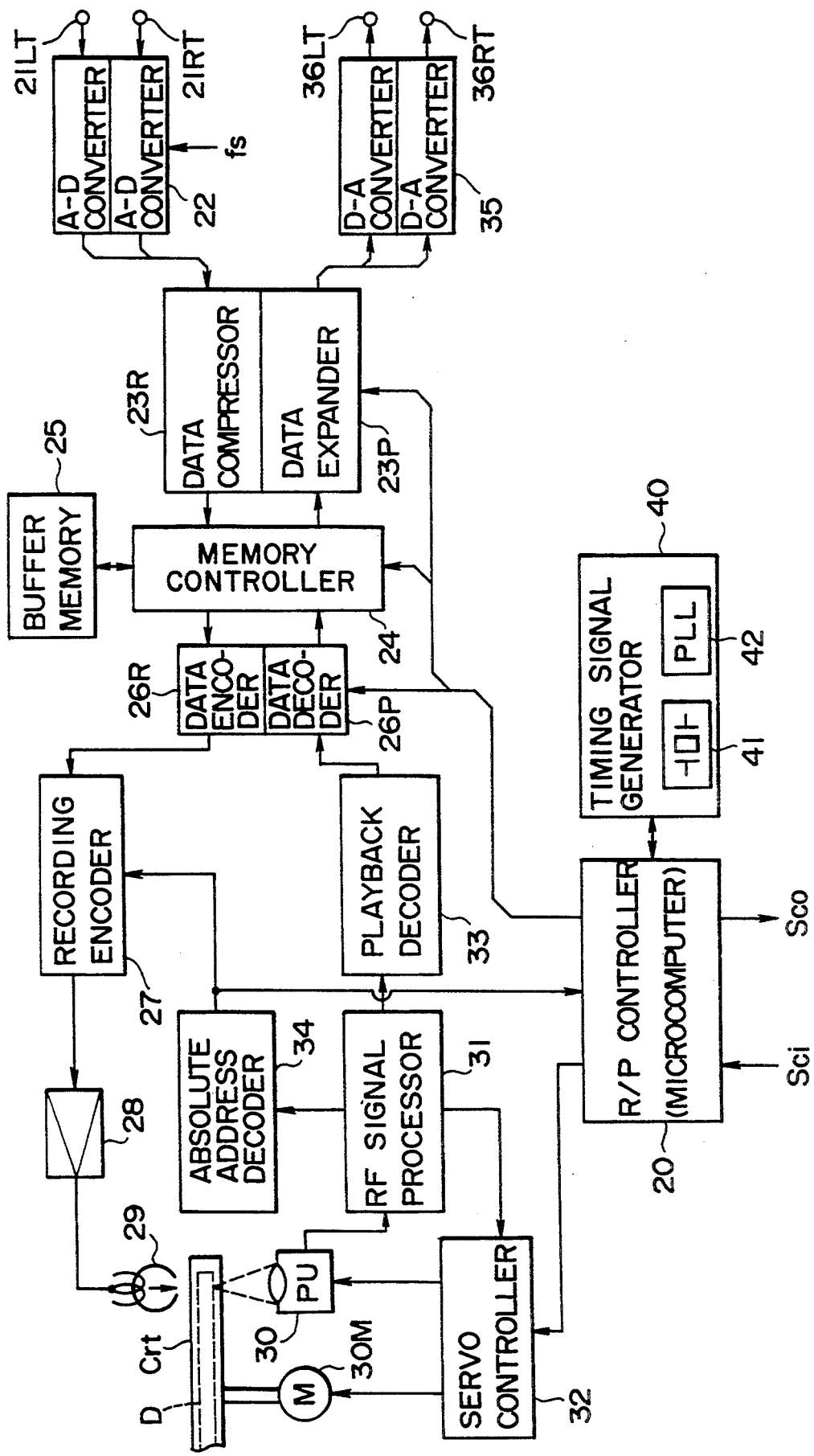
FIG. 1 is a block diagram of a recording/playback unit in a disc recording and/or reproducing apparatus of the present invention.

FIG. 1 is a principle block diagram of an audio data compression-expansion type magneto-optical disc recording and/or reproducing apparatus of the present invention.

In FIG. 1, D denotes an optical disc. The disc D employed in the present invention is a rewritable optical disc as a magneto-optical disc. The magneto-optical disc has a recording layer where data is recordable, reproducible and erasable.

The disc D has an outer diameter of about 64 mm, and spiral record tracks are formed thereon at a pitch of, e.g., about 1.6 μm. The disc D is rotated at a constant linear velocity (CLV) of, e.g., 1.2–1.4 m/sec. Audio data is recorded thereon after being compressed in the form of digital signal, so that data of 130 Mbytes or more can be recorded and reproduced.

On the disc D, a pregroove or prepits is formed previously for using a tracking control of a light beam emitted from an optical head, later explained. And particularly in the present invention, an absolute address code is recorded in such pregroove in a manner to be superimposed on a tracking-control wobbling signal. For the purpose of preventing deposition of dust or protection from damage, the disc D is contained in a disc cartridge Crt.

On the disc D, additional data relative to the recorded audio data is also recorded in its innermost track. This additional data is generally termed TOC (Table Of Contents) inclusive of the number of recorded programs, data indicating the position of each recorded program, and the play time of each program.

[Recording section in recording/playback unit]

Now the operation for recording data on the magneto-optical disc D will be described below. In accordance with a recording mode or a playback mode, the mode of each circuit is selectively changed by a mode switching signal R/P obtained from a recording/playback controller 20 consisting of a microcomputer. This controller 20 is controlled by a control signal Sci from a system controller 10 shown in FIG. 4.

Two-channel analog audio signals received via a pair of input terminals 21LT, 21RT are sampled in an A-D converter 22 at a sampling frequency of 44.1 kHz, and each of the sampled values is converted into a 16-bit digital signal. The digital signal thus obtained is then supplied to a data compressor 23R. In the present invention, the input digital signal is compressed approximately to 1/5 by the data compressor 23R. A variety of data compression methods may be adopted inclusive of 4-bit quantization ADPCM (Adaptive Delta Pulse Code Modulation) and modified DCT (Discrete Cosine Transformation).

The data thus compressed in the data compressor 23R is transferred to a buffer memory 25 controlled by a memory controller 24. In the present invention, the buffer memory 25 consists of a D-RAM having a storage capacity of 1 Mbits.

If no track jumps occur, a phenomenon that the recording position on the disc D jumps due to some vibration or shock during the recording operation, the memory controller 24 reads out the compressed data da sequentially from the buffer memory 25 at a higher transfer rate approximately five times the write rate and then transfers the read data to a data encoder 26.

In case any track jump is detected during the recording operation, the memory controller 24 interrupts the data transfer to the encoder 26R and stores in the buffer memory 25 the compressed data da obtained from the processor 23R. And after correction of the recording position, the memory controller 24 resumes the data transfer from the buffer memory 25 to the encoder 26R.

Occurrence of a track jump can be detected by providing a vibration indicator or the like in the apparatus and deciding if the indicated vibration is so great or not as to cause a track jump. On the disc D employed in the invention, an absolute address code is recorded, at the time of forming a pregroove, in a manner to be superimposed on the wobbling signal as mentioned. Therefore a track jump can be detected also by reading out the absolute address code from the pregroove in the recording mode and judging the continuity of the absolute addresses from the decoded output. The circuits may be so modified as to detect a track jump by taking the logic sum of the detection output from the vibration indicator and the absolute address code. It is necessary that, upon occurrence of any track jump, the output power level of the light beam for recording be lowered or switched off.

Correction of the recording position at the occurrence of a track jump can be executed with reference to the absolute address code of the disc D.

As obvious from the above description, the buffer memory 25 needs to have at least a storage capacity sufficient for storing the compressed data da which corresponds to the time required from the occurrence of any track jump to the proper correction of the recording position. In the invention, the buffer memory 25 has a storage capacity of 1 Mbits, which is so selected as to ensure an adequate margin for completely satisfying the aforementioned condition.

In this case, during a normal operation in the recording mode, the memory controller 24 executes its control action in a manner to minimize the data to be stored in the buffer memory 25. For example, when the amount of the data in the buffer memory 25 has exceeded a predetermined value, merely a fixed amount of the data such as 32 sectors is readout from the buffer memory 25. As a result, the buffer memory 25 is controlled so as to continuously maintain a write space for more than the predetermined amount of data. In the present invention, 1 sector is equal to 1 CD-ROM sector of approximately 2 Kbytes.

The data encoder 26R serves to encode the compressed data da read out from the buffer memory 25 to thereby form data of a CD-ROM sector structure. Hereinafter the data including the 32-sector audio data will be referred to as one cluster.

The output data of a unitary cluster from the data encoder 26R is supplied to a recording encoder 27 which executes a coding process for error detection and correction and also a process of adaptively modulating the data for recording, e.g., EFM (Eight-Fourteen Modulation) in this invention.

The error detection and correction code is obtained by additionally interleaving and changing the CIRC (Cross Interleave Reed-Solomon code).

Since the record data in this case are intermittent ones of unitary clusters, a splice recording operation is performed for the joints thereof by adding data of several sectors anterior and posterior to the data of each unitary cluster.

The coded data from the recording encoder 27 is supplied via a drive circuit 28 to a magnetic head 29. The magnetic head 29 is driven by the drive circuit 28 to generate a modulated vertical magnetic field according to the recording data and supply the vertical magnetic field to the magneto-optical disc D. The record data supplied to the head 29 is in the form of a unitary cluster, and splice recording is performed intermittently.

The disc D is contained in the disc cartridge Crt. When the disc cartridge Crt is loaded in the apparatus, a shutter is opened so that the disc D is exposed from an opening formed in the disc cartridge Crt. Then a disc table, not shown, provided on a rotary shaft of a disc drive motor 30M is inserted into a spindle hole of the disc cartridge Crt. The disc table is engaged with the disc D to thereby rotate the same. In this case, the disc drive motor 30M is controlled by a servo control circuit, later explained, so as to rotate the disc D at a constant linear velocity (CLV) of 1.2–1.4 m/sec.

The magnetic head 29 is disposed opposite to the disc D which is exposed from the opening of the cartridge Crt. An optical head 30 is provided at a position opposite to the reverse side of the disc D with respect to its one side opposite to the magnetic head 29. The optical head 30 includes a photodetector, a laser diode as a light beam source, a collimator lens, an objective lens, a polarized beam splitter, and a cylindrical lens. In the recording mode, a light beam of a fixed power greater than that used in the playback mode is irradiated onto the record track. And the data is recorded thermomagnetically on the disc D by a combination of the irradiated light beam from the optical head 30 and the modulated vertical magnetic field from the magnetic head 29. The magnetic head 29 and the optical head 30 are so arranged as to be movable in the radial direction of the disc D.

In the recording mode, the output of the optical head 30 is supplied via an RF signal processor 31 to an absolute address decoder 34, so that the absolute address code from the pregroove on the disc D is extracted and decoded. The absolute address data thus decoded is supplied to the recording encoder 27 to be thereby inserted as absolute address data in the record data and then is recorded on the disc D. The absolute address data outputted from the absolute address decoder 34 is supplied also to the recording/playback controller 20 so as to be used for recognition and control of the recording position on the disc D.

The output of the RF signal processor 31 is supplied to the servo control circuit 32. In the servo control circuit 32, a control signal is produced on the basis of the signal from the pregroove of the disc D so as to maintain the linear velocity of the motor 30M constant under servo control.

[Playback section in recording/playback unit]

The disc D loaded in the apparatus is rotated by the disc drive motor 30M. And similarly to the recording mode, the disc drive motor 30M is controlled by the servo control circuit 32 in accordance with the signal obtained from the pregroove. As a result, the rotation of the disc D by the drive motor 30M is maintained constant at the same linear velocity of 1.2–1.4 m/sec as in the recording mode.

In the playback mode, the optical head 30 receives the reflected light beam of the light beam irradiated onto a target track, thereby detecting the focus error by astigmatism means or the like. At this time, the tracking error by push-pull means or the like according to the reflected light beam, and further detecting the polarization angle, such as Kerr rotation angle, of the reflected light beam from the target track. Consequently the optical head 30 generates a reproduced RF signal as an output signal.

The output signal of the optical head 30 is supplied to the RF signal processor 31, which then generates the focus error signal and the tracking error signal from the output signal of the optical head 30. The output signal of the optical head 30 further supplies the extracted signals to the servo controller 32 while converting the reproduced signals into binary signals and supplying the same to a playback decoder 33.

The servo control circuit 32 executes focus control of the optical mechanism for the optical head 30 in a manner to decrease the focus error signal to zero. The servo control circuit 32 also executes tracking control of the optical mechanism for the optical head 30 in a manner to decrease the tracking error signal to zero.

The RF signal processor 31 extracts the absolute address code detecting of the pregroove and supplies the code to an absolute address decoder 34. Then the absolute address data outputted from the decoder 34 is supplied to the recording/playback controller 20 so as to be used by the servo control circuit 32 for position control of the optical head 30 in the radial direction of the disc D. For controlling the position on the record track being scanned by the optical head 30, the recording/playback controller 20 is capable of utilizing also the address data of unitary sectors extracted from the reproduced data.

In the playback mode, as will be described later, the compressed data read from the disc D is written in the buffer memory 25 and then is read out therefrom to be expanded. However, due to the difference between the two data transmission rates, the operation of reading the data from the disc D by the optical head 30 is performed intermittently so that the data stored in the buffer memory 25 is not decreased below a predetermined amount.

The data read from the disc D is supplied via the RF signal processor 31 to the playback decoder 33. In response to the binary playback signal obtained from the RF signal processor 31, the playback decoder 33 executes required processes conforming with those of the recording encoder 27, such as EFM demodulation and interpolation for error detection and correction. The output data of the playback decoder 33 is supplied to the data decoder 26P.

The data decoder 26P decodes the data of the CD-ROM sector structure to resume the former data in the compressed state.

The output of the data decoder 26P is transferred via the track jump memory controller 24 to the buffer memory 25, where the data is written at a predetermined rate.

If no track jumps occur, a phenomenon that the playback position jumps on the disc due to some vibration or shock during the playback operation, the memory controller 24 reads out the compressed output data of the data decoder 26P sequentially at a lower transfer speed approximately 1/5 times the write speed, and then transfers the read data to the data expander 23P. In this case, the memory controller 24 controls the write and read operation relative to the buffer memory 25 in a manner that the data stored in the buffer memory 25 is maintained below a predetermined amount.

When any track jump is detected in the playback mode, the memory controller 24 interrupts the action of writing the data from the data decoder 26P into the buffer memory 25 and merely transfers the data to the data expander 23P. And after correction of the playback position on the disc D, the memory controller 24 resumes the action of writing the data from the data decoder 26P into the buffer memory 25.

Occurrence of a track jump can be detected by various means as in the recording mode; e.g., by providing a vibration indicator or using the output data of the absolute address decoder 34, or by taking the logic sum of the output of a vibration indicator and the absolute address code.

In the playback mode, it is also possible to utilize the absolute address data and the address data of unitary sectors which are extracted from the playback data.

As obvious from the above description, the buffer memory 25 in the playback mode needs to have at least a storage capacity sufficient for successively storing the data which corresponds to the time required from the occurrence of any track jump to proper correction of the playback position. If such sufficient storage capacity is ensured, proper transfer of the data can be performed continuously from the buffer memory 25 to the data expander 23P despite occurrence of any track jump. The storage capacity of 1 Mbits of the buffer memory 25 employed in this invention is so selected as to retain an adequate margin for completely satisfying the above condition.

Also as described, during a normal operation in the playback mode, the memory controller 24 executes its control action in a manner that a predetermined amount of data greater than the aforementioned minimum necessity is stored in the buffer memory 25. For example, when the data in the buffer memory 25 has been decreased below a predetermined amount, the data from the disc D is intermittently picked up by the optical head 30, and the data obtained from the data decoder 26P is written in the buffer memory 25. As a result, the buffer memory 25 is controlled so as to maintain a sufficient read space greater than the predetermined amount of the data.

In the data expander 23P, the ADPCM data is expanded approximately 5 times inversely to the process of data compression in the recording mode.

The digital audio data outputted from the data expander 23P is supplied to a D-A converter 35 to be thereby converted into the former two-channel analog signal, which is then delivered via a pair of output terminals 36LT and 36RT.

[Timing signal section in recording/playback unit]

The timing of each operation in the recording section and the playback section above-described is set in accordance with timing signals including the aforementioned sampling frequency signal.

In an ordinary magneto-optical disc recording and/or reproducing apparatus, a timing signal generator 40 has a crystal oscillator 41 and a frequency divider 42 employing a phase-locked loop (PLL). The timing signals of adequate frequencies from the generator 40 are supplied to the recording/playback controller 20 and so forth.

For example, the clock frequencies used in the individual circuits are set as follows.

| | |
|---|---|
| Recording/playback controller 20 | 12 MHz |
| Data compressor 23R | 55 MHz |
| Data expander 23P | 55 MHz |
| Recording encoder 27 | 22.6 MHz |
| Playback decoder 33 | 22.6 MHz |

The frequency of the recording current supplied to the magnetic head 29 is set to 800 kHz or so.

[Overall constitution of disc recording and/or reproducing apparatus with radio receiving function]

In the disc recording and/or reproducing apparatus of the present invention with a radio receiving function, the recording/playback unit above-mentioned is housed together with a radio receiving unit in a single cabinet. An input signal received by the radio receiving unit is recordable on a recording medium by the recording/playback unit.

Hereinafter the recording and/or reproducing apparatus of the present invention with a radio receiving function will be described with reference to FIGS. 2 through 5.

Figure 2:
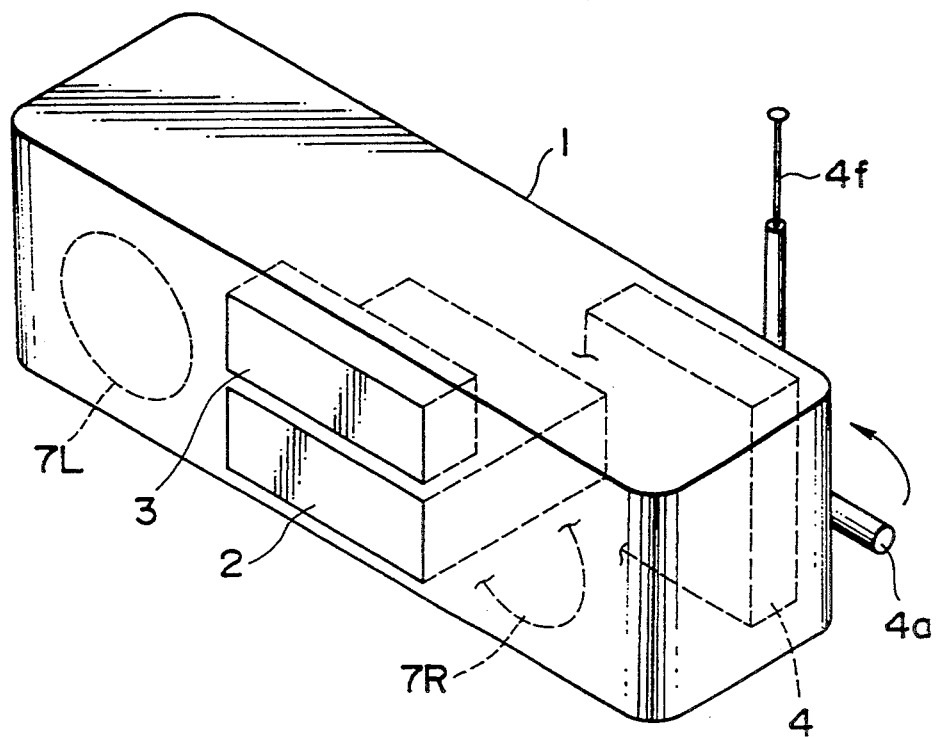
FIG. 2 is a perspective view of a mechanical structure in a first embodiment of the present invention.

In FIG. 2, the above-mentioned magneto-optical disc recording/playback unit 2 is disposed at a lower center position of a cabinet 1 composed of synthetic resin. An LCD (Liquid Crystal Display) device 3 for displaying the operating state and so forth of the recording/playback unit 2 is disposed thereabove. An AM-FM broadcast tuner 4 is disposed in a rear right area of the cabinet 1. Both an AM bar antenna 4a and an FM rod antenna 4f are connected to the tuner 4. Further loudspeakers 7L, 7R are disposed at left and right ends of the cabinet 1 respectively.

Figure 4:
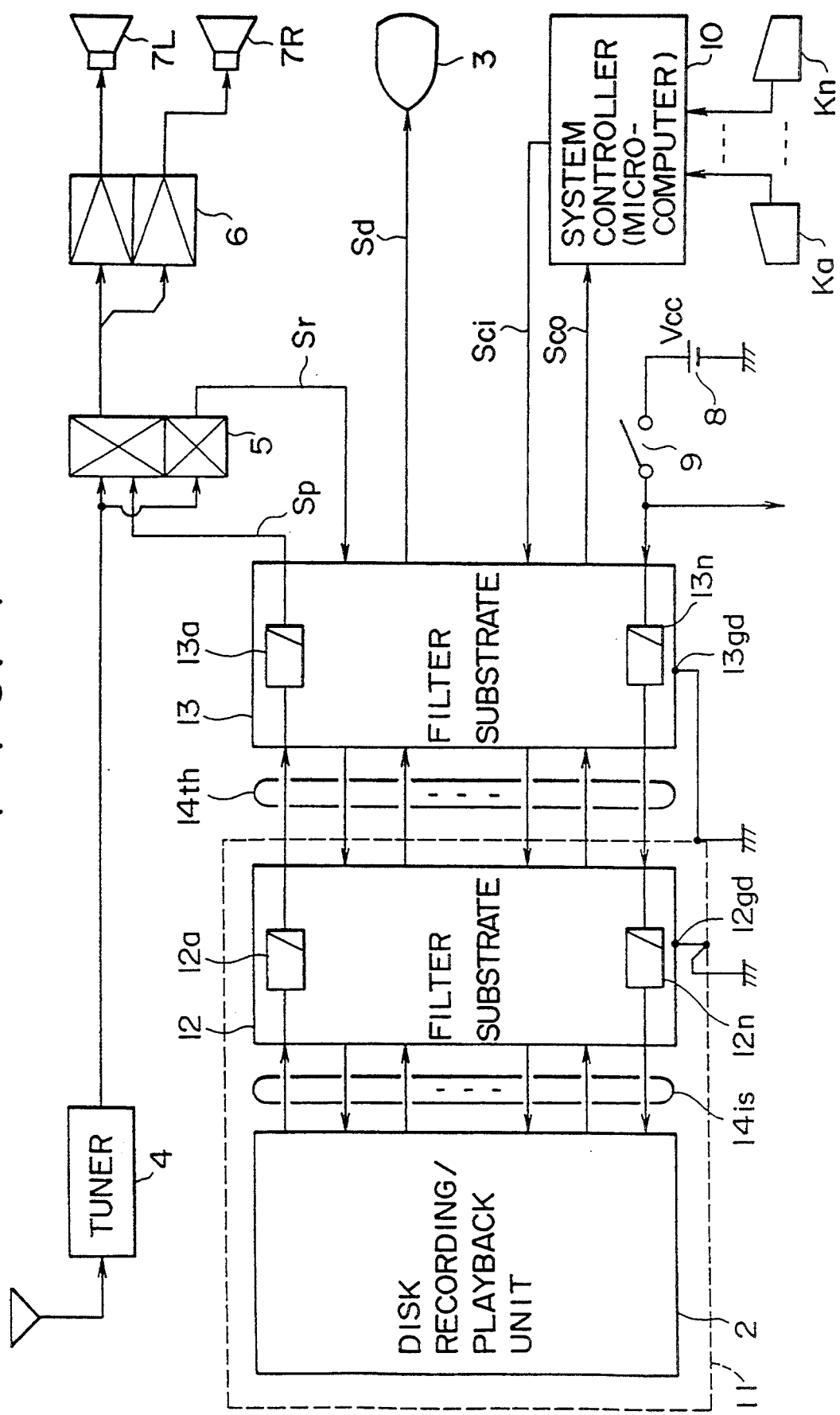
FIG. 4 is a block diagram of the first embodiment of the present invention.

As shown in FIG. 4, the output audio signal of the tuner 4 is supplied via a selector 5 and a power amplifier 6 to the loudspeakers 7L and 7R. Meanwhile the power from a battery 8 is supplied via a power switch 9 to individual component circuits.

Denoted by 10 is a system controller consisting of a microcomputer to which a plurality of keys Ka-Kn are connected. And various control actions are executed by manipulating such keys to set the operation mode and so forth for the disc recording/playback unit 2 and the tuner 4.

Under control of the microcomputer 10, the selector 5 is so connected as to distribute the output audio signal of the tuner 4 as an input audio signal Sr to the recording/playback unit 2 or to supply the output audio signal Sp of the recording/playback unit 2 to the power amplifier 6.

The power amplifier 6 and the microcomputer 10 are disposed in, e.g., an upper center area of the cabinet 1.

Figure 3:
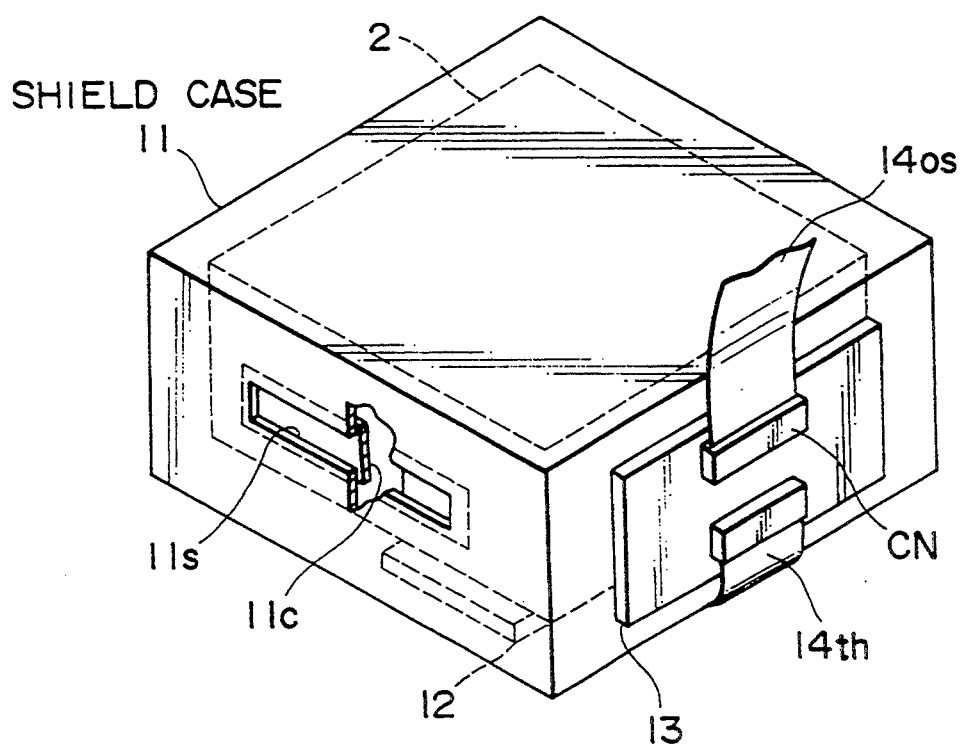
FIG. 3 is a perspective view illustrating the structure of principal component elements in the first embodiment of the present invention.

In this embodiment, as illustrated in FIG. 3, the disc recording/playback unit 2 is housed in a case 11 of a tin-placed steel sheet and is shielded electromagnetically. And a cover 11c of a shielding material is provided on a slot 11s formed in the case 11 for insertion of a disc or a disc cartridge.

Filter boards 12 and 13 are disposed inside and outside the shield case 11 respectively. Each of the filter boards 12 and 13 is composed of, e.g., a laminated plate with copper sheets stuck to both surfaces thereof, and a wiring pattern is formed on one surface. Required component elements are soldered to such one surface, while the other surface is used as a grounding conductor. The two filter boards 12 and 13 are attached to the case 11 in a state where the wiring pattern surface is sandwiched between the grounding conductor surface and the wall of the case 11.

The filter boards 12 and 13 are connected to each other by means of a lead assembly 14th which includes a plurality of wires led out through the case 11. The outer filter board 13 is connected to the circuits outside the case 11 by means of a lead assembly 14os. The lead assemblies 14th and 14os employed in this embodiment are composed of shielded wires. In each of the lead assemblies 14th and 14os, a plurality of elemental wires are grouped to form a flat bundle, and the ends thereof are connected to a flat connector CN.

A capacitor, not shown, of an adequate capacitance may be additionally provided at the position of the shield case 11 where the lead assembly 14th pierces.

As shown in FIG. 4, low-pass filters 12a–12n and 13a–13n are mounted on the filter boards 12 and 13 respectively so as to attenuate the unrequited high-frequency components radiated from the recording/playback unit 2.

Ground ends 12gd, 13gd of the filter boards 12, 13 are connected respectively to the shield case 11 which is grounded at proper positions thereof. In this embodiment, the case 11 is grounded at one or more internal positions while being also grounded at one or more external positions.

The ground positions of the case 11 may be common on the two filter boards 12 and 13.

In this embodiment, as shown in FIG. 4, the entire inputs and outputs of the disc recording/playback unit 2 in the shield case 11 are transferred via the two filter boards 12 and 13 to and from the circuits outside the case 11.

The exemplary inputs and outputs of the disc recording/playback unit 2 are as follows.

Input and output audio signals Sr, Sp
Segment data signal Sd to LCD 3
Input and output control data signals Sci, Sco
Power Vcc from battery 8

[Suppression of unrequited high-frequency components I]

As described, the disc recording/playback unit 2 has a circuit to generate high-frequency clock pulses for the high-frequency recording current and the digital process. And unrequited high-frequency components derived from such high-frequency currents, clock pulses and higher and lower harmonics thereof are radiated from the recording/playback unit 2 and enter into the AM-FM tuner 4 disposed in the proximity of the unit 2 as shown in FIG. 2. As a result, satisfactory reception of a radio broadcast is disturbed.

In this embodiment, therefore, the disc recording/playback unit 2 is housed in the shield case 11 for the purpose of suppressing the radiation of such unrequited high-frequency components.

The filter board 12 is provided in the case 11, and low-pass filters 12a–12n mounted on the board 12 serve to attenuate the unrequited high-frequency components which are radiated from the circuits of the recording/playback unit 2 and are superimposed on the lead assembly 14os in the case 11.

Thus, it becomes possible to reduce the level of the unrequited high-frequency components appearing outside the case 11 via the lead assembly 14th which pierces through the shield case 11.

Further in this embodiment, the second filter substrate 13 is provided outside the case 11, and the unrequited high-frequency components remaining on the lead assembly 14th are attenuated by low-pass filters 13a–13n mounted on the board 13.

As a result, the level of the unrequited high-frequency components can be lowered on the lead assembly 14os disposed on the output side of the filter board 13, whereby the high-frequency noise entering into the tuner 4 is reduced to a remarkable extent to consequently ensure satisfactory reception of a radio broadcast.

[Suppression of unrequited high-frequency components II]

Hereinafter another preferredembodiment of the present invention will be described with reference to FIG. 5.

In the embodiment of this diagram, a disc recording/playback unit 2 is housed in a shield case 11, and further opto-electric conversion blocks 15, 17 are also contained in the shield case 11. Electro-optical conversion blocks 16, 18 corresponding respectively to the input and output signals of the recording/playback unit 2 are disposed outside the shield case 11 respectively.

Each of the opto-electric conversion blocks 15, 17 consists of an opto-electric conversion element such as a photodiode, while each of the electro-optical conversion blocks 16, 18 consists of an electro-optical conversion element such as a light emitting diode.

The opto-electrical conversion blocks 15, 17 and the electro-optical conversion blocks 16, 18 are connected to each other by means of an optical fiber 19, so that the aforementioned input and output signals are transferred in the form of optical signals between the circuits outside the shield case 11 and the disc recording/playback unit 2 housed in the case 11. Since the power for the recording/playback unit 2 is supplied through a lead assembly 14, a filter such as the aforesaid one may be inserted when necessary.

The other constitution is the same as that of the first embodiment shown in FIG. 4.

In this second embodiment, as mentioned, the input and output signals of the disc recording/playback unit 2 are transferred via the optical signal path to and from the tuner 4 and the other circuits, so that the noise derived from the electromagnetic waves leaking from the recording/playback unit 2 in the shield case 11 is diminished to consequently cause remarkable reduction of the high-frequency noise entering into the tuner 4, whereby a radio broadcast is rendered receivable in a satisfactory state.

In this embodiment where the electromagnetic noise leaking to the outside of the shield case 11 is remarkably attenuated, it becomes possible to incorporate the bar antenna in the apparatus to eventually realize dimensional reduction of the whole apparatus with facility. Furthermore, the necessity of using shielded leadwires can be eliminated due to the effect of suppressing the radiation of the electromagnetic noise, hence achieving curtailment of the production cost.

The above problem of radiation of unrequited high-frequency components derived from the recording current and the high-frequency clock pulses in digital recording is caused also in a composite audio apparatus which consists of a radio receiver and a digital recorder without a playback unit. And application of the present invention to such composite audio apparatus is effective as well to eliminate the interference of electromagnetic noise.

What is claimed is:

1. A disc apparatus with a radio receiving function, comprising:
   a radio receiving unit;
   a recording/playback unit having a high-frequency clock generator;
   a shield case for wholly shielding said recording/playback unit from electromagnetic waves;
   a first filter means disposed inside said shield case to suppress the unrequited high-frequency components of input and output signals of said recording/playback unit; and
   a second filter means disposed outside said shield case to suppress the unrequited high-frequency components of input and output signals of said first filter means.

2. The apparatus according to claim 1, wherein the ground ends of said first and second filter means are connected to said shield case.

3. The apparatus according to claim 1, wherein said unrequited high-frequency components are within a receivable range of said radio receiving unit.

4. The apparatus according to claim 1, wherein said recording/playback unit comprising a high-frequency clock generator comprises an optical head, a magnetic head disposed opposite to said optical head, an input means, a signal processing means for executing a predetermined process of the input signal obtained from said input means, a modulation means for executing a predetermined modulation of the output of said signal processing means, a drive means for driving said magnetic head by using the modulated signal obtained from said modulation means, and a control means for controlling said recording/playback unit.

5. The apparatus according to claim 4, wherein said high-frequency clock generator is at least one of said control means, said modulation means, said magnetic head and said signal processing means.

6. The apparatus according to claim 1, wherein the input signal supplied to said recording/playback unit is the signal received by said radio receiving unit.

7. The apparatus according to claim 4, wherein the input signal obtained from said input means is the signal received by said radio receiving unit.

8. A disc apparatus with a radio receiving function, comprising:
   a radio receiving unit;
   a recording/playback unit having a high-frequency clock generator;
   a shield case for wholly shielding said recording/playback unit from electromagnetic waves;
   a first electro-optical conversion means disposed inside said shield case for converting the output electric signal of said recording/playback unit into an optical signal and also converting the input optical signal of said recording/playback unit into an electric signal; and
   a second electro-optical conversion means disposed outside said shield case for converting said optical signal into an electric signal and also converting said electric signal into an optical signal.

9. The apparatus according to claim 8, wherein said recording/playback unit comprising a high-frequency clock generator comprises an optical head, a magnetic head disposed opposite to said optical head, an input means, a signal processing means for executing a predetermined process of the input signal obtained from said input means, a modulation means for executing a predetermined modulation of the output of said signal processing means, a drive means for driving said magnetic head by using the modulated signal obtained from said modulation means, and a control means for controlling said recording/playback unit.

10. The apparatus according to claim 9, wherein said high-frequency clock generator is at least one of said control means, said modulation means, said magnetic head and said signal processing means.

11. The apparatus according to claim 8, wherein the input signal supplied to said recording/playback unit is the signal received by said radio receiving unit.

12. The apparatus according to claim 9, wherein the input signal supplied to said recording/playback unit is the signal received by said radio receiving unit.

* * * * *